(12) United States Patent
Sakurai

(10) Patent No.: US 6,832,104 B2
(45) Date of Patent: Dec. 14, 2004

(54) CARD HAVING COMMUNICATION FUNCTION

(75) Inventor: Shigeki Sakurai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 419 days.

(21) Appl. No.: 10/161,710

(22) Filed: Jun. 5, 2002

(65) Prior Publication Data
US 2002/0198024 A1 Dec. 26, 2002

(30) Foreign Application Priority Data
Jun. 20, 2001 (JP) ........................................ 2001-186750

(51) Int. Cl.$^7$ ................................................ H04B 1/38
(52) U.S. Cl. ........................ 455/558; 455/558; 455/557; 455/552.1
(58) Field of Search ................................ 455/558, 557, 455/41.2, 41.3

(56) References Cited

U.S. PATENT DOCUMENTS

| | | | |
|---|---|---|---|
| 5,628,055 A | * 5/1997 | Stein | 455/575.1 |
| 5,890,074 A | 3/1999 | Rydbeck et al. | 455/558 |
| 5,905,947 A | 5/1999 | Stein | 455/90 |
| 5,963,872 A | 10/1999 | Stein | 455/557 |
| 6,016,432 A | 1/2000 | Stein | 455/557 |
| 6,463,469 B1 | * 10/2002 | Yavitz | 709/219 |
| 6,714,799 B1 | * 3/2004 | Park et al. | 455/558 |
| 6,782,245 B1 | * 8/2004 | Lazzarotto et al. | 455/226.1 |
| 2003/0060233 A1 | * 3/2003 | Masaki et al. | 455/558 |

* cited by examiner

Primary Examiner—Nick Corsaro
Assistant Examiner—Shaima Q. Aminzay
(74) Attorney, Agent, or Firm—Fitzpatrick, Cella, Harper & Scinto

(57) ABSTRACT

A card having a communication function which is adaptable for use in various environments. The card includes a plurality of interfaces adapted for a plurality of signal formats, wherein the card can selectively set an interface to use depending on the signal format being used.

11 Claims, 14 Drawing Sheets

FIG. 4A S400

| Pin Num | Signal Name | Pin Type | Pin Num | Signal Name | Pin Type |
|---|---|---|---|---|---|
| 1 | GND | | 26 | -CD1 | O |
| 2 | D03 | I/O | 27 | D11 | I/O |
| 3 | D04 | I/O | 28 | D12 | I/O |
| 4 | D05 | I/O | 29 | D13 | I/O |
| 5 | D06 | I/O | 30 | D14 | I/O |
| 6 | D07 | I/O | 31 | D15 | I/O |
| 7 | -CE1 | I | 32 | -CE2 | I |
| 8 | A10 | I | 33 | -VS1 | O |
| 9 | -OE | I | 34 | -IORD | I |
| 10 | A09 | I | 35 | -IOWR | I |
| 11 | A08 | I | 36 | -WE | I |
| 12 | A07 | I | 37 | RDY/BSY | O |
| 13 | VCC | | 38 | VCC | |
| 14 | A06 | I | 39 | -CSEL | I |
| 15 | A05 | I | 40 | -VS2 | I |
| 16 | A04 | I | 41 | RESET | I |
| 17 | A03 | I | 42 | -WAIT | O |
| 18 | A02 | I | 43 | -INPACK | O |
| 19 | A01 | I | 44 | -REG | I |
| 20 | A00 | I | 45 | BVD2 | I/O |
| 21 | D00 | I/O | 46 | BVD1 | I/O |
| 22 | D01 | I/O | 47 | D08 | I/O |
| 23 | D02 | I/O | 48 | D09 | I/O |
| 24 | WP | O | 49 | D10 | I/O |
| 25 | -CD2 | O | 50 | GND | |

STANDARD INTERFACE

FIG. 4B S401

| Pin Num | Signal Name | Pin Type | Pin Num | Signal Name | Pin Type |
|---|---|---|---|---|---|
| 1 | GND | | 26 | -CD1 | O |
| 2 | Z | I/O | 27 | Z | I/O |
| 3 | Z | I/O | 28 | Z | I/O |
| 4 | Z | I/O | 29 | Z | I/O |
| 5 | Z | I/O | 30 | Z | I/O |
| 6 | Z | I/O | 31 | Z | I/O |
| 7 | Z | I | 32 | Z | I |
| 8 | Z | I | 33 | -VS1 | O |
| 9 | Z | I | 34 | Z | I |
| 10 | Z | I | 35 | Z | I |
| 11 | Z | I | 36 | Z | I |
| 12 | Z | I | 37 | UART RX | O |
| 13 | VCC | | 38 | VCC | |
| 14 | Z | I | 39 | Z | I |
| 15 | UART RTS | I | 40 | -VS2 | O |
| 16 | UART TX | I | 41 | RESET | I |
| 17 | UART CTS | I | 42 | Z | O |
| 18 | PCMSYNC | I | 43 | Z | O |
| 19 | PCMCLK | I | 44 | Z | I |
| 20 | PCMIN | I | 45 | Z | I/O |
| 21 | Z | I/O | 46 | Z | I/O |
| 22 | Z | I/O | 47 | Z | I/O |
| 23 | Z | I/O | 48 | Z | I/O |
| 24 | PCMOUT | O | 49 | Z | I/O |
| 25 | -CD2 | O | 50 | GND | |

SCO & ACL ADAPTED INTERFACE

CARD HAVING COMMUNICATION FUNCTION

BACKGROUND OF THE INVENTION

1. Field of the Invention

The present invention relates to a card, e.g., a PC card, that is detachably inserted to an information processing terminal, including a personal computer and a portable information terminal, when used.

2. Description of the Related Art

Information processing terminals, including a personal computer and a portable information terminal, are capable of having a detachable PC card inserted/attached to it. Examples of such PC cards are a memory card utilized as a storage medium, a modem card for wire communication, an ISDN card, a LAN card, a wireless LAN card for wireless communication, and a PHS card. By using those PC cards, a personal computer or a portable information terminal is flexibly adaptable for various situations and environment under which it is employed. For example, communication can be performed using a LAN card when the environment allows for the use of wired LAN, and using a wireless LAN card when the environment allows for the use of wireless LAN.

When using a PC card, a card connector is inserted to a PC card slot of a PC card interface provided in an information processing terminal in conformity with the PC Card Standards of PCMCIA (Personal Computer Memory Card International Association). When a PC card is not used, the card connector can be withdrawn from the PC card slot.

Recently, with the reduction in size of information processing terminals, cards having smaller sizes have been put into the market. In particular, a Compact Flash (abbreviated to "CF" hereinafter) card proposed by CFA (Compact Flash Association) is already utilized in a small-sized information processing terminal such as a digital camera and a portable information terminal. With the advent of CF cards, adaptable for the above-mentioned various functions, it has become possible to provide cards having smaller sizes and more convenient portability.

A PC card has a 68-pin connector and employs a parallel data bus up to 32 bits as a host interface. On the other hand, a CF card has a 50-pin two-piece connector and employs a parallel data bus up to 16 bits, as a host interface.

Further, with recent widespread usage of digital equipment, the ability to form wireless networks everywhere including offices, homes and so on, has received attention. Particularly, the short-distance wireless communication standard called "Bluetooth" is known as a technology that was developed for connection between a notebook personal computer and a portable telephone. Application of the Bluetooth technology has spread over all kinds of electronic equipment without being restricted by frames represented by peripheral equipment.

Bluetooth technology is also adapted for speech communication and is able to use a line-exchange type SCO (Synchronous Connection Oriented) link that establishes a connection, ensuring real-time correspondence. With an SCO link, a communication time (time slot for communication) is allocated beforehand, and data is transmitted and received at constant intervals. In general data communication, a packet-exchange type ACL (Asynchronous Connection-Less) link is employed. With the ACL link, a communication time is not particularly allocated, and data is transmitted and received only as the occasion requires. Using an ACL link for speech communication causes deterioration in real-time correspondence and sound quality due to a packet delay.

FIG. 11 shows one example of a configuration of a general Bluetooth communication environment. A Bluetooth host 1100 is capable of establishing connections to an IP network 1103 and a line exchange network 1104 which are installed as parts of a communication infrastructure. Also, in FIG. 11, a Bluetooth data terminal 1101 and a Bluetooth cordless telephone 1102 are provided as Bluetooth terminals to form an environment in which a 1:2 piconet can be formed. The Bluetooth data terminal 1101 is able to establish connection for data communication to the IP network 1103 via the Bluetooth host 1100, by using the ACL link. Simultaneously, the Bluetooth cordless telephone 1102 is able to establish a connection for real-time speech communication to the line exchange network 1104 via the Bluetooth host 1100 by using the SCO link. The Bluetooth host 1100 also is capable of processing both the ACL link and the SCO link at the same time.

FIG. 12 shows a configuration of a Bluetooth communicating section built in the Bluetooth host 1100. Numeral 1204 denotes a base band unit having the function of a link controller only, or the functions of both a link controller and a link manager for Bluetooth. The base band unit 1204 has a data communication signal line 1206 corresponding to the ACL link and a speech communication signal line 1207 corresponding to the SCO link. A host CPU 1200 is connected to the base band unit 1204 via a data communication interface 1202 and supervises overall control of the Bluetooth host 1100. The data communication interface 1202 has, for example, the function of making it adaptable to the format enabling the data communication signal line 1206 to be directly connected to a data bus of the host CPU 1200, or the function of making it adaptable to the format of a serial data communication line so that matching with a peripheral device interface of the host CPU 1200 can be established. The speech communication interface 1203 has the function of making it adaptable to a digital signal, e.g., a PCM (Pulse Code Modulation) signal, and an analog signal so that the speech communication signal line 1207 of the base band unit 1204 is connected to a speech processing unit 1201. The speech processing unit 1201 has the function of establishing an electrical interface adapted for the line exchange network 1104 shown in FIG. 11. Although the data communication interface 1202 and the speech communication interface 1203 are built in the base band unit 1204, both interfaces will be described below as being separated from each other for convenience of explanation. Data communication through the ACL link is performed via an RF unit 1205 for transmitting and receiving data with wireless communication, the base band unit 1204, the data communication interface 1202 and the host CPU 1200. Speech communication, maintaining real-time correspondence through the SCO link, is performed via a route separated from the data communication interface 1202, downstream of the base band unit 1204, and then passing the speech communication interface 1203 and the speech processing unit 1201.

Hitherto, PC and CF cards adapted for a Bluetooth communication function have been constructed such that all kinds of communications between a base band unit and a host CPU for the Bluetooth communication pass through a bus interface. FIG. 13 shows a configuration of a conventional Bluetooth-adapted PC card. An RF unit 1305 and a base band unit 1304 are the same as those shown in FIG. 12. A data communication signal 1303 from the base band unit 1304 is converted by a PC bus controller 1302 into a bus signal 1301 having the bus format adapted for a PC bus. The converted bus signal 1301 is introduced to a PC card connector 1300. However, a speech communication route from the base band unit 1304 is not provided, or is held in a non-use state.

FIG. 14 shows a PC card interface section of a conventional host. A PC card connector 1400 is connected in the bus signal format to a host CPU 1402 via a PC bus controller 1401. Thus, in a conventional wireless communication device, the PC card connector 1300 of the PC card is connected to the PC card connector 1400 of the host, and the base band unit 1304 is coupled to the host CPU 1402 through the PC card bus interface.

The CF card also has a similar configuration to that of the PC card.

Because, as described above, a Bluetooth communicating section incorporated in a PC or CF card is constructed such that a data signal line from a base band unit is adapted only for an ACL link coupled in the bus format for packet communication, the following problems are experienced.

Even when a PC or CF card slot is provided and a PC or CF card can be used, good speech communication maintaining real-time correspondence cannot be achieved and hence the card is not adaptable for various situations and environments in use.

Also, to be adapted for the SCO link, another Bluetooth module for the SCO link must be incorporated in a host. The necessity of additionally incorporating a dedicated module increases the cost and is uneconomical.

On the other hand, if a PC or CF card adapted only for the SCO link is provided, a host having a conventional standard bus interface adapted for the ACL link cannot handle such a card. Therefore, a host provided with a new PC or CF card slot specifically adapted for the SCO link must be provided, and this necessity also increases the cost and is uneconomical. Further, flexibility of a card slot, i.e., an intrinsic feature of a card slot being flexibly adapted for various environments in use, is lost from a host. On the user side, there occurs a problem in that combinations between a card to be used and a host are different depending on applications, and this increase in complexity is troublesome and inconvenient to the user.

SUMMARY OF THE INVENTION

Accordingly, it is an object of the present invention to provide a card having a communication function which is adaptable for use in various environments.

Another object of the present invention is to provide a card having a communication function which can selectively set an interface and handle a plurality of signal forms by a single card.

Still another object of the present invention is to provide a card having a communication function which is economical and convenient to use.

According to one aspect, the present invention which achieves these objectives relates to a card having a communication function, comprising:

first interface means for performing communication in a first card bus signal format between a host and a base band unit which provide communication links for data and speech with wireless communication;
second interface means for communicating data and speech at the same time in a second signal format between said host and said base band unit;
coupling/separating means for coupling and separating said host and a wireless communication module through the insertion/withdrawal of a card, wherein said coupling/separating means is shared, in which said first interface means is connected to said host and said second interface means is connected to said host; and
switching means for selectively switching over between a mode for executing communication with said host using said first interface means and a mode for executing communication with said host using said second interface means, in which said card is connected to said host through said coupling/separating means.

According to another aspect, the present invention which achieves these objectives relates to an adapter having a communication function, comprising:

first interface means for performing communication in a first signal format between a communicating unit and another unit which provide communication links for data and speech;
second interface means for performing communication in a second signal format between said communicating unit and said another unit;
coupling/separating means for coupling and separating said another unit and said communicating unit, wherein said coupling/separating means is shared, in which said first interface means is connected to said another unit and said second interface means is connected to said another unit; and
switching means for selectively switching over between a mode for executing communication with said another unit using said first interface means and a mode for executing communication with said another unit using said second interface means, in which said adapter is connected to said another unit through said coupling/separating means.

Further objects, features and advantages of the present invention will become apparent from the following description of the preferred embodiments with reference to the attached drawings.

BRIEF DESCRIPTION OF THE DRAWINGS

FIG. 4 shows tables representing pin assignments of a CF card connector used in the first embodiment of the present invention.

DESCRIPTION OF THE PREFERRED EMBODIMENTS (First Embodiment)

Figure 1:
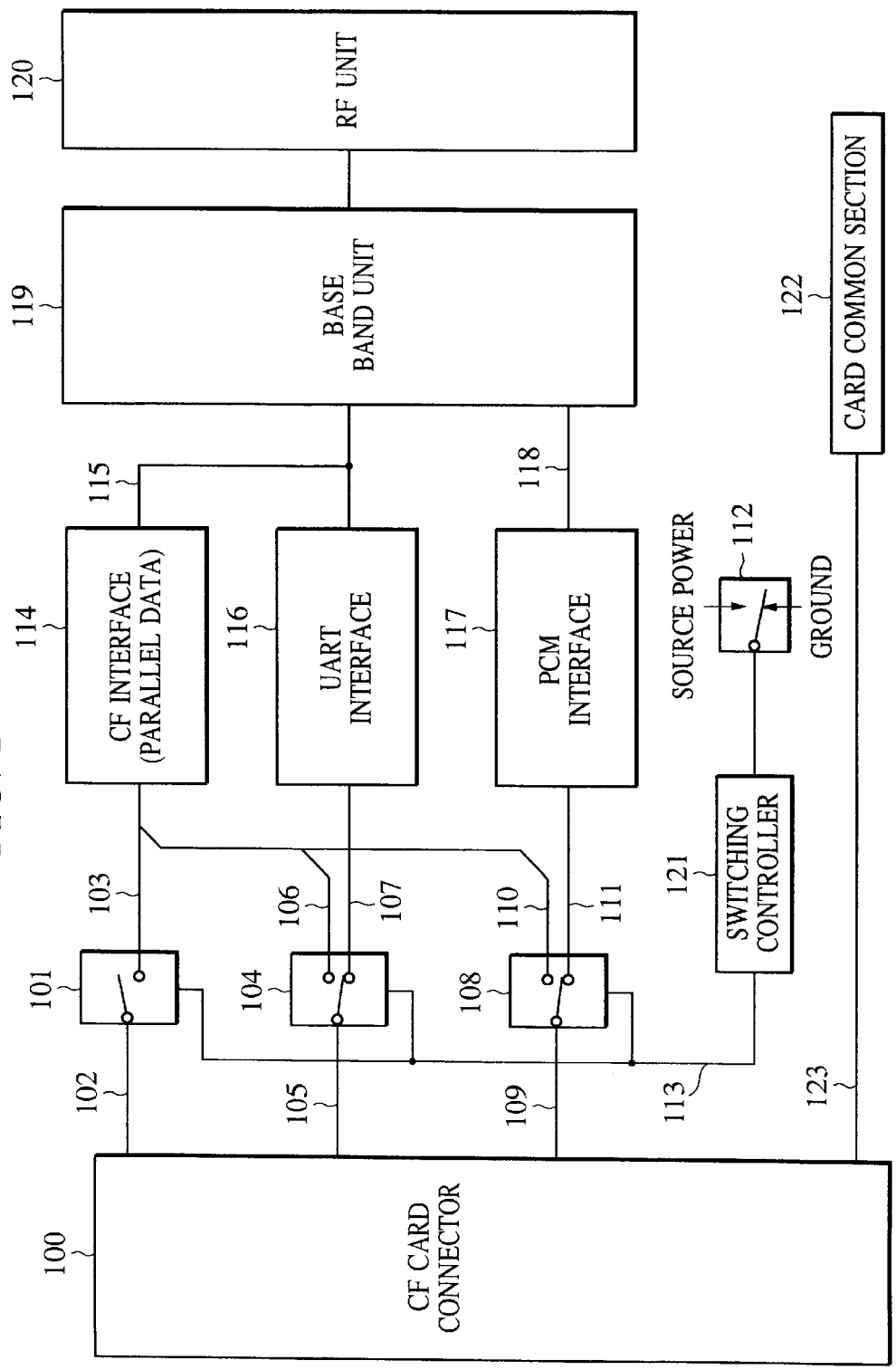
FIG. 1 is a block diagram showing a schematic configuration of a CF card according to a first embodiment of the present invention.

A CF card according to a first embodiment of the present invention will be described below with reference to FIG. 1. In this embodiment, a CF card in conformity with the standards of CFA (Compact Flash Association) is described by way of example. Also, this embodiment employs the Bluetooth communication function as a wireless communication function. FIG. 1 shows, in the form of a block diagram, an internal schematic configuration of the CF card. As shown in FIG. 1, the CF card has a CF card connector 100 for coupling to a CF card slot of a host. The CF card connector 100 is a 50-pin connector and is connected to switching blocks 101, 104 and 108 and a card common section 122 via signal lines 102, 105, 109 and 123, respectively. The switching blocks 101, 104 and 108 are connected to a switching controller 121 via a signal line 113, and perform switching operations in response to instructions from the switching controller 121. The switching block 101 is connected to a CF interface 114 via a signal line 103. The CF interface 114 is connected to a base band unit 119 via a signal line 115, and executes the operation of converting a data signal from the base band unit 119 to be adapted for a standard bus interface of the CF card. The switching block 104 is connected to the CF interface 114 via a signal line 106 and receives a part of the signals used in the standard bus interface. The switching block 104 is also connected to a UART (Universal Asynchronous Receiver Transmitter) interface 116 via a signal line 107. The UART interface 116 is connected to the base band unit 119 via the signal line 115. The UART interface 116 executes the operation of converting a data signal for an ACL link from the base band unit 119 into the UART format and transmitting and receiving the data signal as a serial signal. The switching block 108 is connected to the CF interface 114 via a signal line 110 and receives a part of the signals used in the standard bus interface. The switching block 108 is also connected to a PCM (Pulse Code Modulation) interface 117 via a signal line 111. The PCM interface 117 is connected to the base band unit 119 via a signal line 118. The PCM interface 117 executes the operation of converting speech data for an SCO link from the base band unit 119 into the PCM signal format and transmitting and receiving the data signal as a serial signal. Three types of speech coding methods, i.e., CVSD (Continuous Variable Slope Delta), $\mu$-law log PCM, and A-law log PCM, are defined by the Bluetooth standards. Regardless of which one of those speech coding methods is employed, the PCM interface 117 can be provided in the format adapted for the host. The base band unit 119 is connected to an RF unit 120. The base band unit 119 serves as a Bluetooth base band layer and has a protocol for interfacing a transmitted/received data packet. Also, the base band unit 119 provides a communication link for transmitting and receiving data transferred to and from the host, and manages designation and switching-over of transmission/reception frequency for management of frequency hopping, a time-base slot, etc. The RF unit 120 serves as a Bluetooth physical layer and performs transmission/reception of electric waves with the frequency-hopping type spread spectrum method using a frequency band of 2.4 GHz. The switching controller 121 is connected to a switch 112. The switch 112 is connected to a source power for the CF card and a ground. The switch 112 can be manually switched over for connection to the source power and the ground, and outputs the status of the switch 112 to the switching controller 121. The card common section 122 includes the source power, the ground, and a reset signal which are defined by the CF card standards, and is used in common to CF cards.

Figure 2:
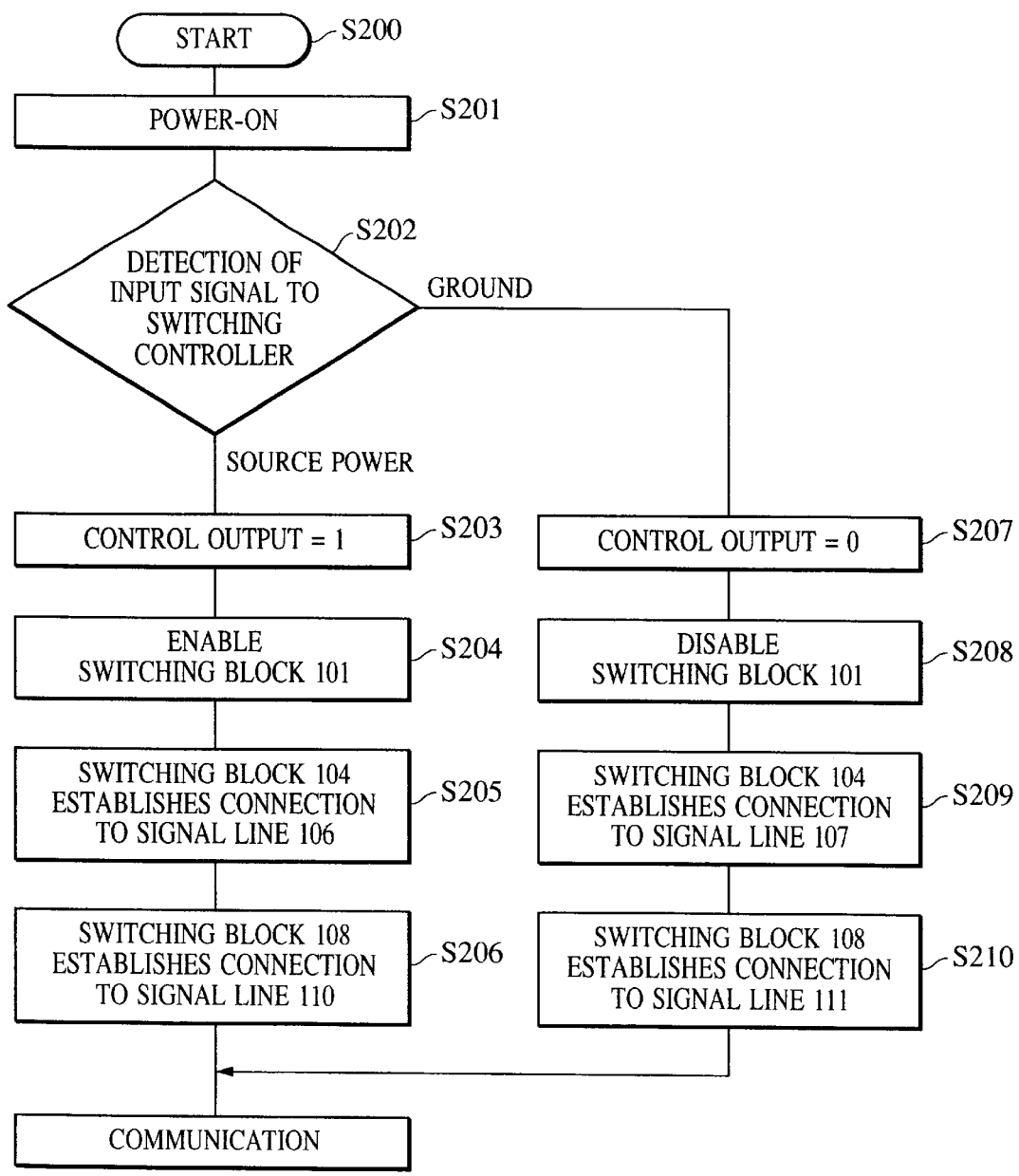
FIG. 2 is a flowchart showing a general operation of the CF card according to the first embodiment of the present invention.

FIG. 2 is a flowchart showing a switching operation in the first embodiment. The switching operation in the CF card of the first embodiment will be described below with reference to FIGS. 1 and 2. The CF-card switch 112 is mounted at an arbitrary position of the CF card, and its switch position is manually set before the CF card is inserted to the host. The switch position connected to the power source side sets the CF interface, i.e., the standard parallel bus interface, and the switch position connected to the ground side sets the UART and PCM interfaces. First, when performing Bluetooth communication by a host having a CF card interface as a parallel bus interface, the position of the switch 112 is set to the source power side and the CF card is inserted to the CF card slot of the host. When the source power is supplied from the host in step S201, the switching controller 121 detects an input of the source power from the switch 112 in step S202. Then, in step S203, the switching controller 121 outputs a control signal "1" to the signal line 113. In accordance with the signal supplied via the signal line 113, the switching block 101 operates to establish connection between the signal lines 103 and 102 in step S204. Also, the switching block 104 operates to establish connection between the signal lines 106 and 105 in step S205. The switching block 108 operates to establish connection between the signal lines 110 and 109 in step S206. With those operations, the CF card connector 100 can be connected to the CF interface 114.

Next, when performing communication with both a Bluetooth data terminal and a Bluetooth cordless telephone at the same time, for example, by a host having a CF card interface with both link functions, i.e., speech communication via an SCO link and data communication via an ACL link, the position of the switch 112 is set to the ground side and the CF card is inserted to the CF card slot of the host. After the supply of the source power in step S201, the ground is detected in step S202. Then, in step S207, the switching controller 121 outputs a control signal "0" to the signal line 113. In accordance with the signal supplied via the signal line 113, the switching block 101 operates to cut off the connection between the signal lines 103 and 102 in step S208. Also, the switching block 104 operates to establish connection between the signal lines 107 and 105 in step S209. The switching block 108 operates to establish connection between the signal lines 111 and 109 in step S210. With those operations, between the Bluetooth module and the host, the PCM interface 117 for the SCO link and the UART interface 116 for the ACL link are both connected to the host via the CF card connector 100. Thus, depending on the setting of the switch position of switch 112 the CF card connector can be shared by the standard bus interface and the specific interface the PCM interface adapted for the SCO link and the UART interface adapted for the ACL link in a mixed manner.

Figure 3:
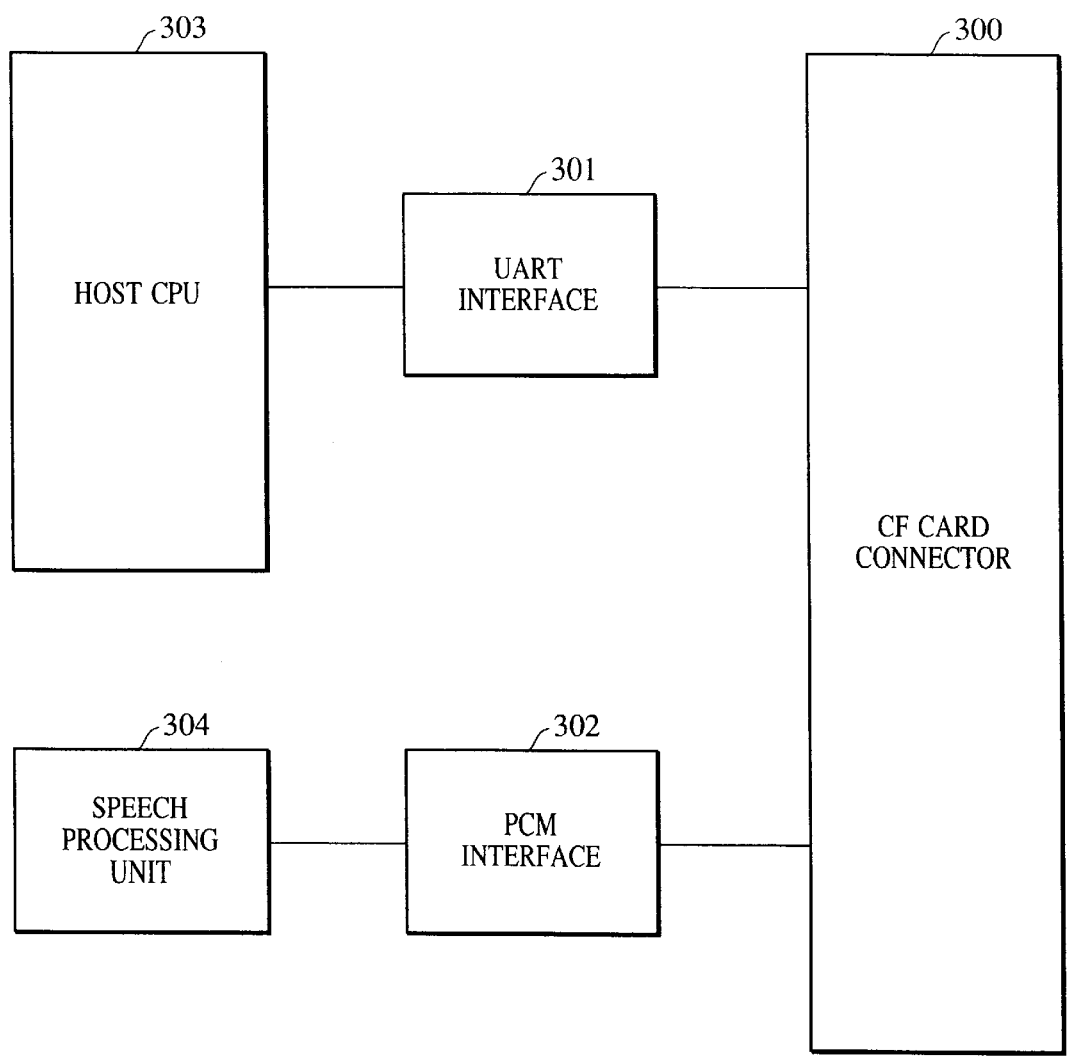
FIG. 3 is a block diagram showing a schematic configuration of a host used in the first embodiment of the present invention.

FIG. 3 is a block diagram showing a schematic configuration of the host adapted for both the SCO link and the ACL link. A UART interface 301 and a PCM interface 302 are connected to a CF card connector 300. The UART interface 301 is connected to a host CPU 303 for supervising control of the host, and the PCM interface 302 is connected to a speech processing unit 304. The above-described CF card in which the switch 112 is set to establish connections for both the SCO link and the ACL link can be thus coupled to the UART and PCM interfaces via the connectors 100, 300.

FIG. 4 shows tables representing pin assignments of the CF card connector used in this embodiment. Numeral S400 represents the pin assignment of the standard interface in conformity with the CFA standards, and S401 represents the pin assignment in which signals required for the UART and PCM interfaces are assigned to 50 pins. Signals corresponding to the pin assignment table S400 are described in detail in the CFA standards and hence are not described here. The pin assignment table S401 adapted for the SCO and ACL links is described below. The pin assignment table S401 includes pin numbers 1 to 50, signal names, and pin types indicating input/output at respective pins. In the column Pin Type, "I/O" represents a two-way signal, "I" represents an input signal, and "O" represents an output signal. In the column Signal Name, "Z" represents a signal with a high impedance, "VCC" represents the source power, and "GND" represents the ground. Signals for the UART interface 116 are assigned to four pins, i.e., the 15th to 17th pins and the 37th pin, and signals for the PCM interface 117 are assigned to four pins, i.e., the 18th to 20th pins and the 24th pin. Signals represented by "GND" at the 1st and 50th pins, by "VCC" at the 13th and 38th pins, by "-CD2" at the 25th pin, by "-CD1" at the 26th pin, by "-VS1" at the 33th pin, by "-VS2" at the 40th pin, and by "RESET" at the 41th pin are signals common to the pin assignment of table S400 for the standard interface. Those common signals are contained in the card common section 122 shown in FIG. 1 and are used in common. Thus, depending on the position setting of the switch 112, pin attributes of the CF card connector 100 are switched over between the pin assignment of table S400 for the standard interface and the pin assignment of table S401 for the SCO-and-ACL-adapted interface.

Figure 5:
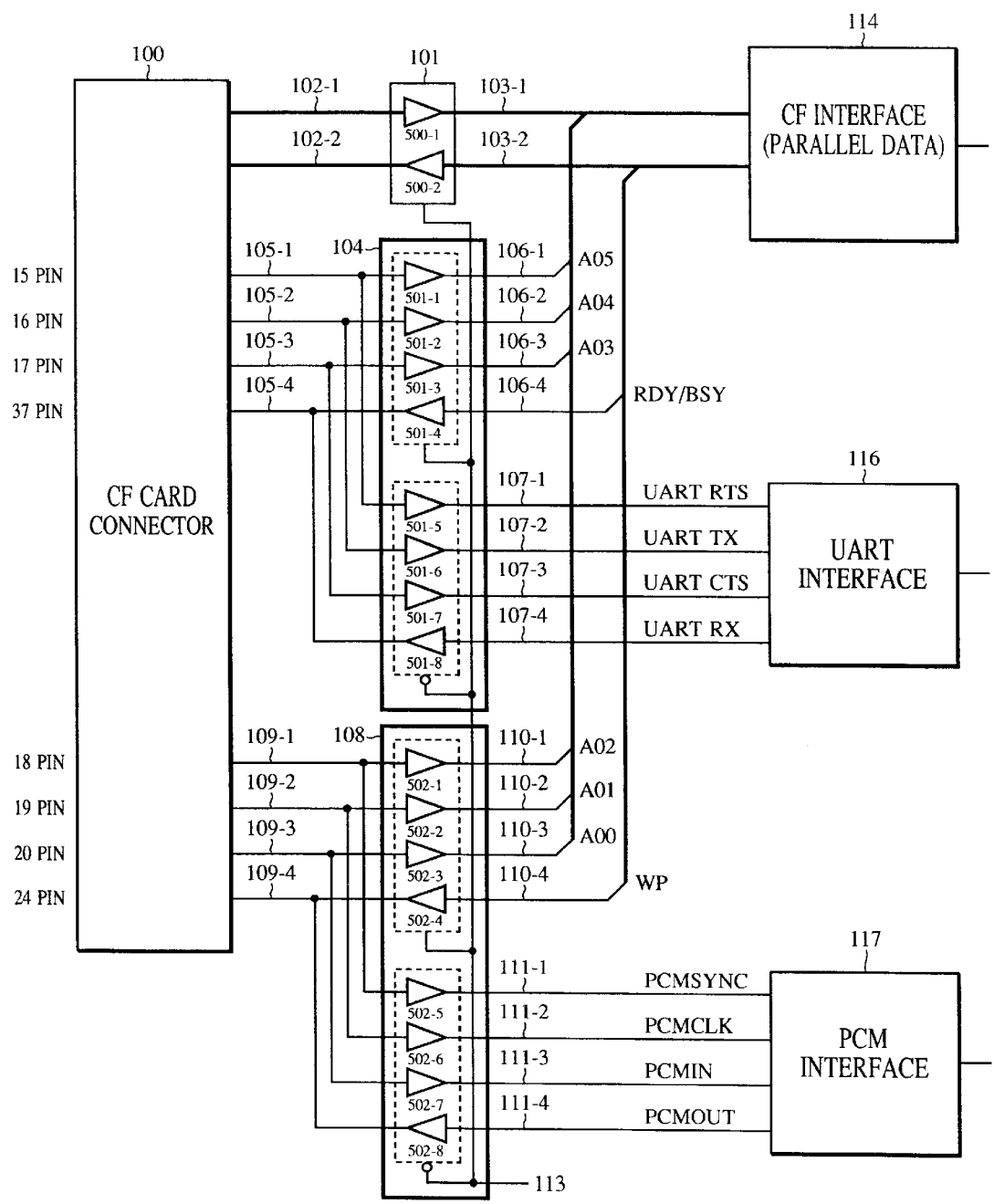
FIG. 5 is a block diagram showing a configuration of switching blocks used in the first embodiment of the present invention.

FIG. 5 shows a detailed configuration of the switching blocks. The switching block 101 comprises multi-input and multi-output gates 500-1, 500-2. The output of the switching block 101 can be made open and enabled in response to a gate signal 113. In the open state, the output of the switching block 101 is brought into an electrically high-impedance state Z. The switching block 104 comprises input gates 501-1, 501-2, 501-3, 501-5, 501-6 and 501-7, and output gates 501-4, 501-8. The input gates 501-1 to 501-3 and the output gate 501-4 are enabled in response to the gate signal 113 being at a level of "1" so that an input signal can be output, and bring their outputs into the electrically high-impedance state in response to the gate signal 113 being at a level of "0". The input gates 501-5 to 501-7 and the output gate 501-8 bring their outputs into the electrically high-impedance state in response to the gate signal 113 being at a level of "1", and enables an input signal to be output in response to the gate signal 113 being at a level of "0". Also, gates 502-1 to 502-8 of the switching block 108 can be similarly controlled in response to the gate signal.

When the standard interface is to be selected by the setting position of the switch 112, the gate signal 113 is set to the source power side, i.e., to a signal level "1". In this case, the switching block 101 is enabled, whereupon a signal 102-1 from the CF card connector 100 is output as an input signal 103-1 to the CF interface 114, and an output signal 103-2 from the CF interface 114 is output as a signal 102-2 and introduced to pins of the CF card connector 100 defined by the CF card standards. In the switching block 104, the gates 501-1 to 501-4 are enabled. Therefore, signals 105-1 to 105-3 from the 15th to 17th pins of the CF card connector 100 are delivered as input signals A05, A04 and A03 to the CF interface 114 via respective signal lines 106-1 to 106-3, and an output signal RDY/BSY from the CF interface 114 is output to the 37th pin of the CF card connector 100 via a signal line 106-4 and 105-4. Likewise, in the switching block 108, output signals from the 18th to 20th pins of the CF card connector 100 are delivered via respective signal lines 109-1 to 109-3 and introduced as input signals A02, A01 and A00 to the CF interface 114 via respective signal lines 110-1 to 110-3, and output signal WP from CF interface 114 is output to the 24th pin of the CF card connector 100 via a signal line 110-4 and 109-4. On the other hand, the gates 501-5 to 501-8 and 502-5 to 502-8 are held in closed states and therefore deliver high-impedance outputs.

Next, when the SCO-and-ACL-adapted interface is selected by the setting position of the switch 112, the gate signal 113 is set to the ground side, i.e., to a signal level "0". In this case, the switching block 101 is disabled, whereupon the gates of the switching block 101 are closed and deliver high-impedance outputs in the output signal lines 103-1 and 102-2. In the switching block 104, the gates 501-5 to 501-8 are enabled. Therefore, output signals from the 15th to 17th pins of the CF card connector 100 are delivered via respective signal lines 105-1 to 105-3 and introduced as input signals UART RTS, UART TX and UART CTS to the UART interface 116 via respective signal lines 107-1 to 107-3. Also, an output signal UART RX from the UART interface 116 is connected to the 37th pin of the CF card connector 100 via signal lines 107-4 and 105-4. Likewise, output signals from the 18th to 20th pins of the CF card connector 100 are delivered via the respective signal lines 109-1 to 109-3 and introduced as input signals PCMSYNC, PCM-CLK and PCMIN to the PCM interface 117 via respective signal lines 111-1 to 111-3. Further, an output signal PCMOUT from the PCM interface 117 is connected to the 24th pin of the CF card connector 100 via signal lines 111-4 and 109-4. On the other hand, the gates 501-1 to 501-4 and 502-1 to 502-4 are held in closed states and therefore deliver high-impedance outputs.

Thus, by changing the switch setting of the CF card to match with the function adaptable by the host, position, the standard bus interface and the specific interface the PCM interface adapted for both SCO and ACL can be provided by sharing the CF card connector.

(Second Embodiment)

A CF card according to the second embodiment of the present invention will be described below with reference to FIG. 6. As with the first embodiment, this embodiment is described in connection with, by way of example, a CF card in conformity with the CFA standards. Also, this embodiment employs a Bluetooth communication function as a wireless communication function.

Figure 6:
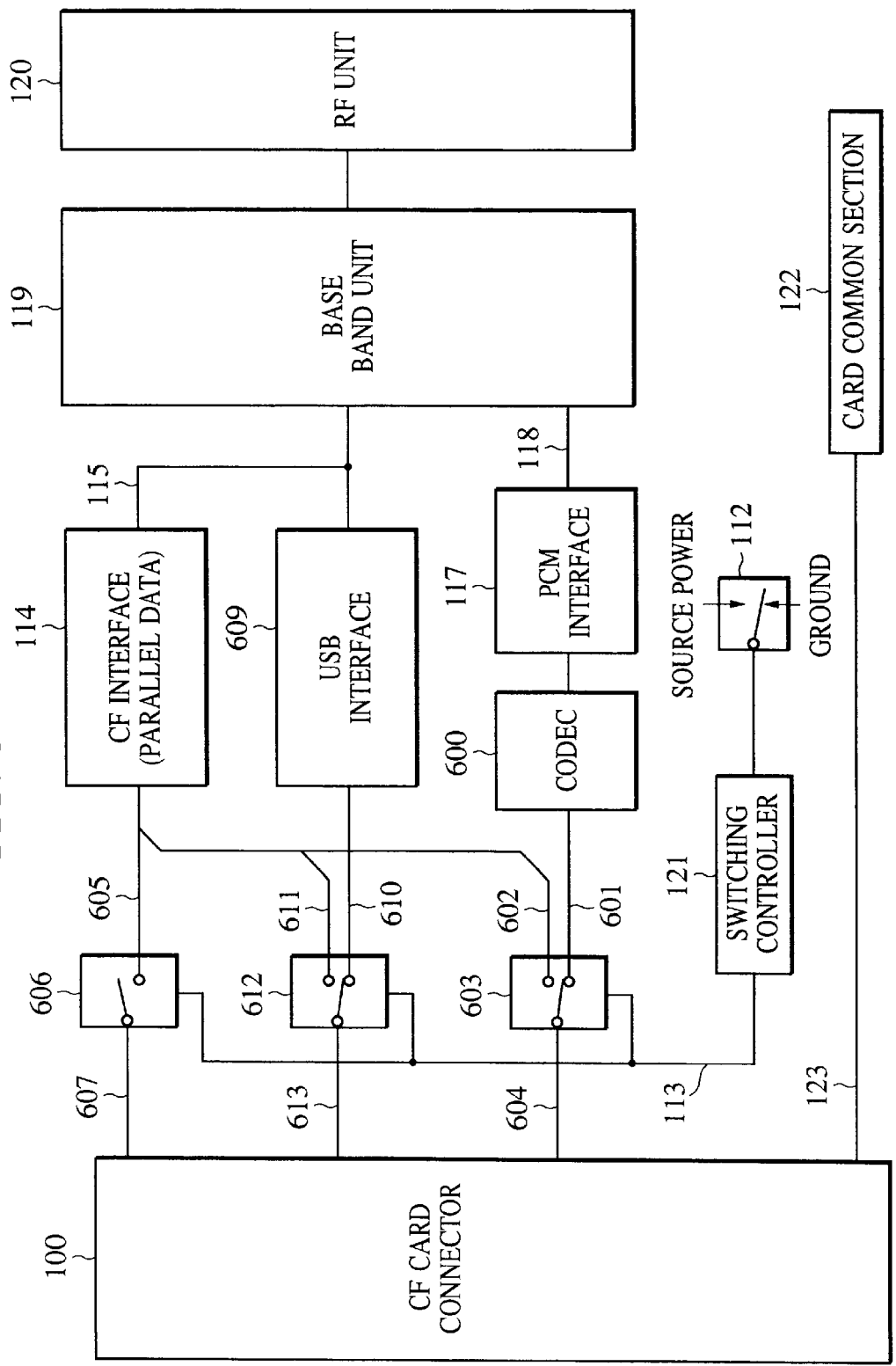
FIG. 6 is a block diagram showing a schematic configuration of a CF card according to a second embodiment of the present invention.

FIG. 6 shows, in the form of a block diagram, an internal schematic configuration of the CF card. Components having the same functions as those of the CF card according to the first embodiment shown in FIG. 1 are denoted by the same numerals and a description thereof is omitted here.

The CF card of this embodiment is featured in that an interface adapted for both the SCO and ACL links handles analog inputs/outputs for speech and a USB (Universal Serial Bus) signal for data. The CF card includes a CODEC 600 that can output a digital signal from the PCM interface 117 after converting it into an analog signal or conversely output an analog signal to the PCM interface 117 after converting it into a digital signal. Also, the CODEC 600 is able to transmit and receive an analog signal to and from the host via the CF card connector 100. The CF card further includes a USB interface 609 that enables data to be transmitted and received between the base band unit 119 and the host via the CF card connector 100 while the data is converted by the USB interface 609 into serial data for use with USB. Signals used in the USB interface 609 are described below. The USB interface 609 has total four signal lines, i.e., a line of source voltage Vcc=5 V, differential data signal lines D+ and D−, and a ground line.

When the standard interface is selected by the setting position of the switch 112, the gate signal 113 is set to the source power side, i.e., to a signal level "1". In this case, switching blocks 606, 612 and 603 make signals enabled with respect to the CF interface 114. More specifically, signal lines 605 and 607 are connected to each other in the switching block 606, signal lines 611 and 613 are connected to each other in the switching block 612, and signal lines 602 and 604 are connected to each other in the switching block 603. On the other hand, when the SCO-and-ACL-adapted interface is selected by the setting position of the switch 112, the gate signal 113 is set to the ground side, i.e., to a signal level "0". In this case, the switching block 606 is turned off and the connection between the signal lines 605 and 607 is cut off. In the switching block 612, a signal line 610 from the USB interface 609 is connected to a signal line 613 leading to the CF card connector 100. In the switching block 603, a signal line 601 from the CODEC 600 is connected to the signal line 604 leading to the CF card connector 100. With those operations, the CF card connector 100 is assigned with an analog speech signal for real-time speech and the above-mentioned four USB signals for ACL-link data.

Thus, as a matter of course, when selecting the specific interface by the switch setting, the CF card is easily adaptable for any signal formats other than those described in the first and second embodiments, so long as the signal format can be handled within the range of pin assignment of the CF card connector 100.

(Third Embodiment)

A CF card according to the third embodiment of the present invention will be described below with reference to FIG. 7. As with the first embodiment, this embodiment is described in connection with, by way of example, a CF card in conformity with the CFA standards. Also, this embodiment employs a Bluetooth communication function as a wireless communication function.

Figure 7:
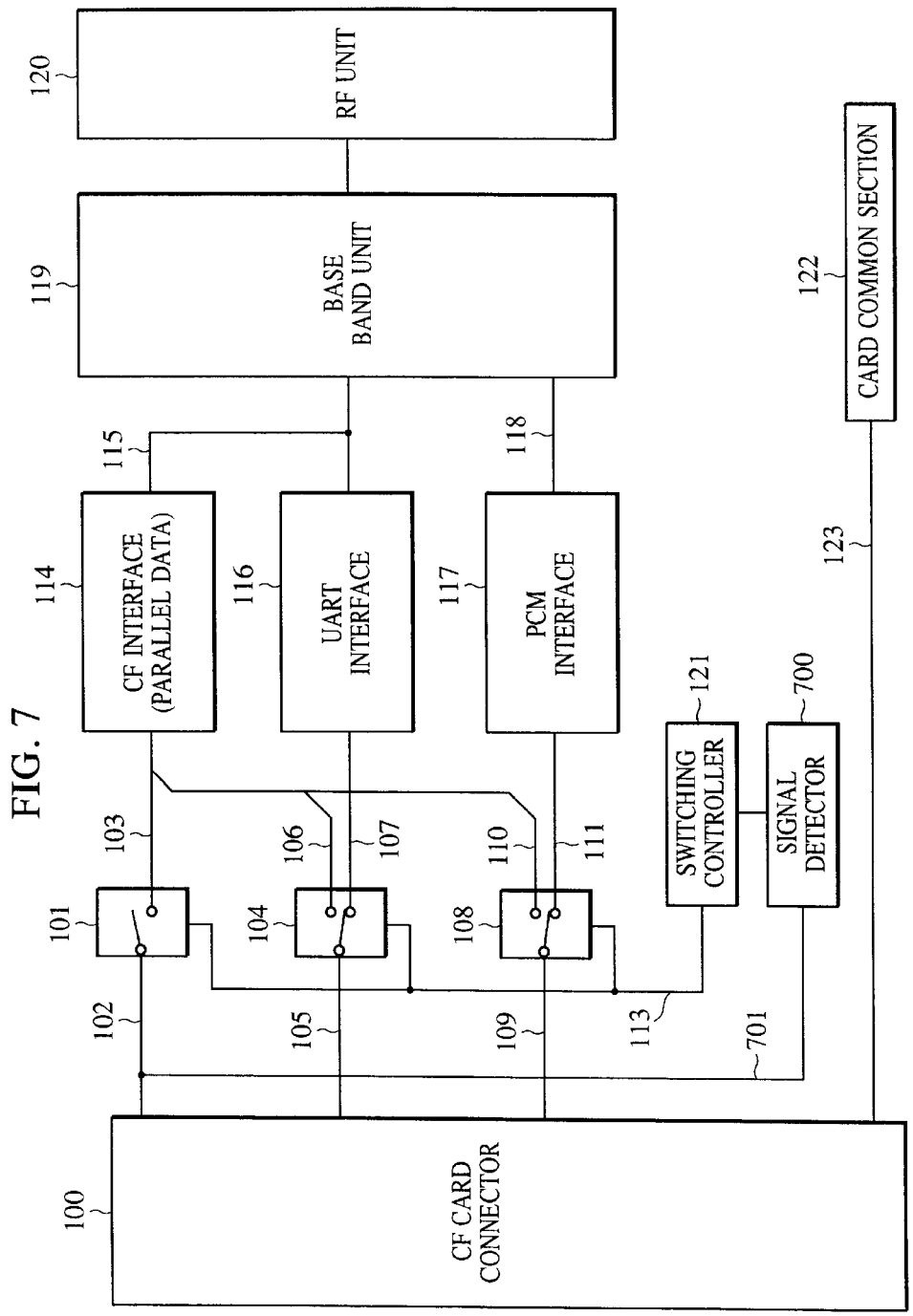
FIG. 7 is a block diagram showing a schematic configuration of a CF card according to a third embodiment of the present invention.

FIG. 7 shows, in the form of a block diagram, an internal schematic configuration of the CF card. Components having the same functions as those of the CF card according to the first embodiment shown in FIG. 1 are denoted by the same numerals and a description thereof is omitted here. The CF card of this embodiment is featured in that a signal detector 700 is provided instead of the switch 112 used in the first and second embodiments. The signal detector 700 is able to receive any signal from the CF card connector 100 via a signal line 701. Upon detecting a signal from the CF card connector 100, the signal detector 700 outputs the detected signal to the switching controller 121.

Assuming the case in which the signal detector 700 receives a -IORD signal from the 34th pin, for example, among signals used in the standard-interface pin assignment of table S400, shown in FIG. 4, selected for the CF card connector, after the CF card is inserted to the host and the source power is supplied, the signal detector 700 operates to detect the -IORD signal from the host within a preset time. Upon detecting the -IORD signal, the signal detector 700 outputs, to the switching controller 121, a signal equivalent to the output of the switch 112 issued when set to the source power side as described above in connection with the first and second embodiments. Through subsequent operations that are similar to the above-mentioned ones and hence not described here, the CF card connector 100 can be connected to the CF interface 114, i.e., it can be set to the standard bus interface. On the other hand, when the signal detector 700 does not detect the -IORD signal, the signal detector 700 outputs a signal equivalent to the output of the switch 112 issued when set to the ground side as described above in connection with the first and second embodiments. Therefore, the CF card connector 100 can be switched over to the specific interface including both the UART interface and the PCM interface in a mixed manner so that it is adapted for both SCO and ACL.

(Fourth Embodiment)

A CF card according to the fourth embodiment of the present invention will be described below with reference to FIG. 8. As with the first embodiment, this embodiment is described in connection with, by way of example, a CF card in conformity with the CFA standards. Also, this embodiment employs a Bluetooth communication function as a wireless communication function.

Figure 8:
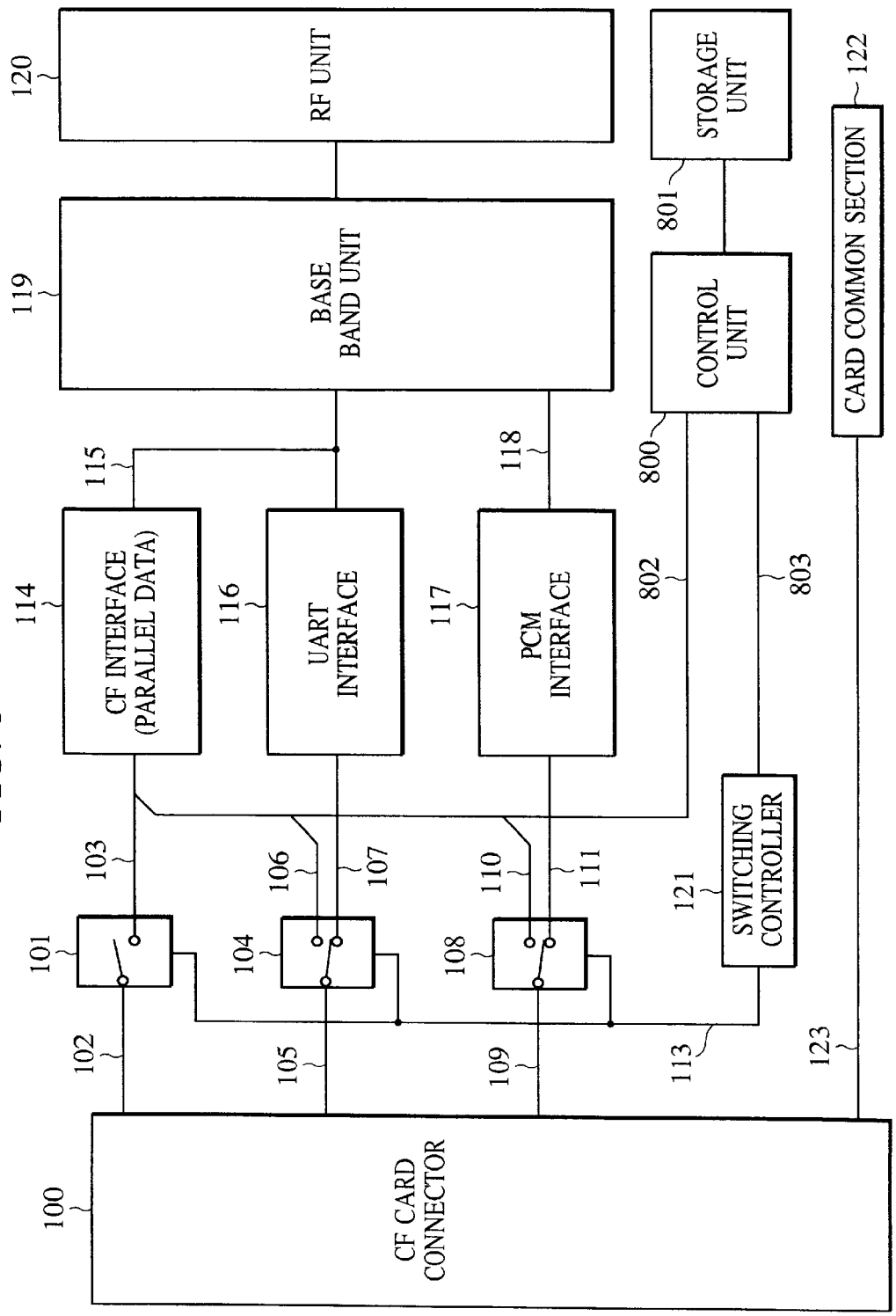
FIG. 8 is a block diagram showing a schematic configuration of a CF card according to a fourth embodiment of the present invention.

FIG. 8 shows, in the form of a block diagram, an internal schematic configuration of the CF card. Components having the same functions as those of the CF card according to the first embodiment shown in FIG. 1 are denoted by the same numerals and a description thereof is omitted here.

The CF card of this embodiment is featured in that a control unit 800 for controlling a usage condition of the CF card and a storage unit 801 for storing a program for the control are provided. The control unit 800 is able to receive a signal from the CF interface 114 via a signal line 802. Also, the control unit 800 is able to output a control signal to the switching controller 121 via a signal line 803. After the supply of the source power, the control unit 800 controls the switching blocks 101, 104 and 108 through the switching controller 121 so that connections to the CF interface 114 are enabled. Subsequently, the control unit 800 is able to receive standard interface signals from the CF card connector 100 as they are, and hence to transmit and receive control information directly to and from the host.

Figure 9:
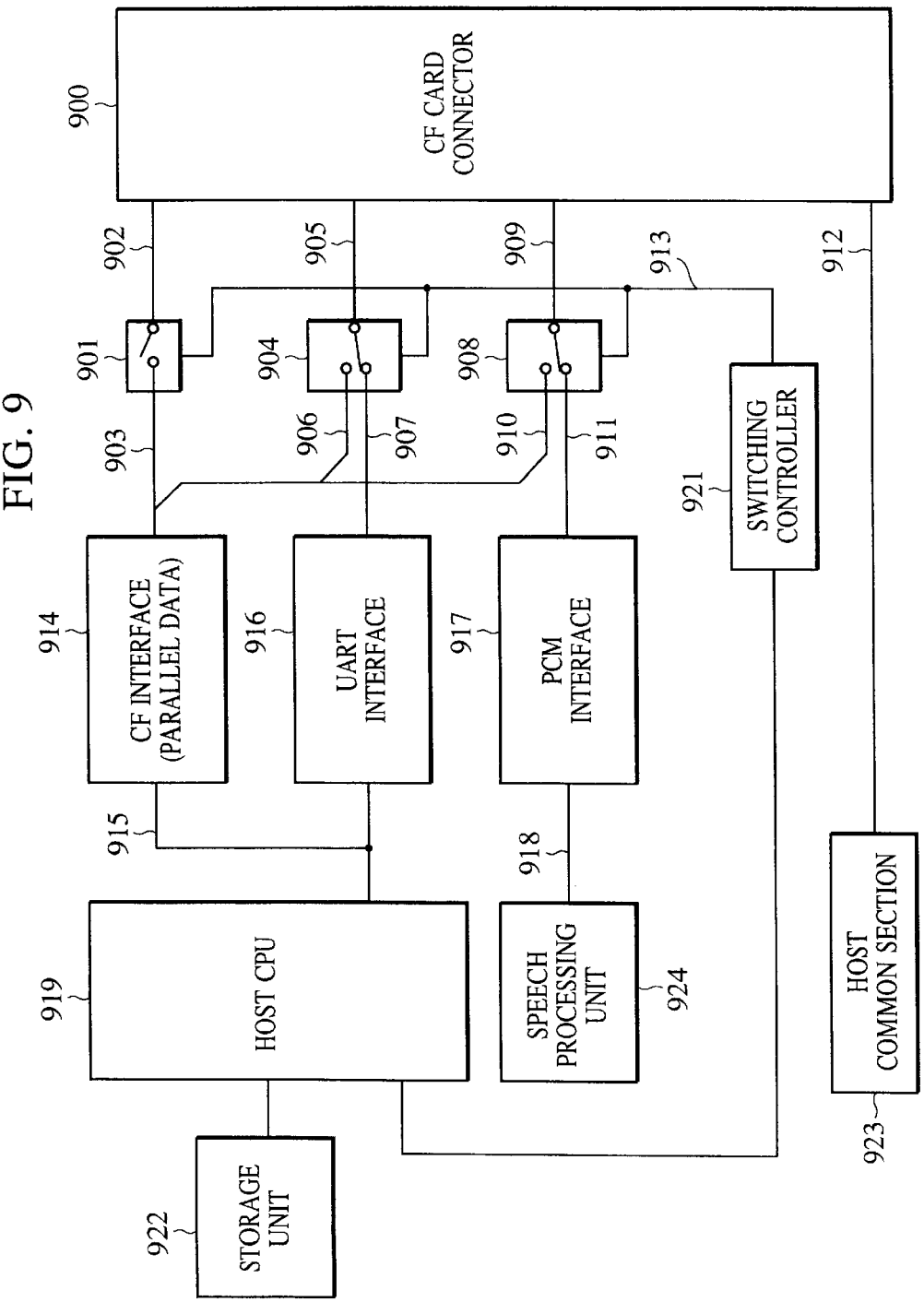
FIG. 9 is a block diagram showing a schematic configuration of a host in the fourth embodiment of the present invention.

FIG. 9 shows, in the form of a block diagram, a schematic configuration of the host corresponding to the CF card of this embodiment. As shown in FIG. 9, the host has a CF card connector 900 for receiving the CF card. The CF card connector 900 is a 50-pin two-piece connector and is connected to switching blocks 901, 904 and 908 and a host common section 923 via signal lines 902, 905, 909 and 912, respectively. The switching blocks 901, 904 and 908 are connected to a switching controller 921 via a signal line 913, and perform switching operations in response to instructions from the switching controller 921. The switching block 901 is connected to a CF interface 914 via a signal line 903. The CF interface 914 is connected to a host CPU 919 via a signal line 915, and executes the operation of converting a data signal from the host CPU 919 to be adapted for the standard bus interface of the CF card. The switching block 904 is connected to the CF interface 914 via a signal line 906 and receives a part of the signals used in the standard bus interface. The switching block 904 is also connected to a UART interface 916 via a signal line 907. The UART interface 916 is connected to the host CPU 919 via the signal line 915. The UART interface 916 executes the operation of converting a data signal for an ACL link from the host CPU 919 into the UART format and transmitting and receiving the data signal as a serial signal. The switching block 908 is connected to the CF interface 914 via a signal line 910 and receives a part of the signals used in the standard bus interface. The switching block 908 is also connected to a PCM interface 917 via a signal line 911. The PCM interface 917 is connected to a speech processing unit 924 via a signal line 918. The PCM interface 917 executes the operation of converting speech data for an SCO link from the speech processing unit 924 into the PCM signal format and transmitting and receiving the data signal as a serial signal. Three types of speech coding methods, i.e., CVSD (Continuous Variable Slope Delta), $\mu$-law log PCM, and A-law log PCM, are defined by the Bluetooth standards. Regardless of which one of those speech coding methods is employed, the PCM interface 917 can be provided in the form adapted for the host. The host CPU 919 is connected to a storage unit 922 in which programs for the host are stored. The host CPU 919 supervises overall control of the host, has a protocol for interfacing a transmitted/received data packet in Bluetooth communication, and provides a communication link for transmitting and receiving data transferred to and from the CF card. The switching controller 921 is connected to the host CPU 919. The host common section 923 includes the source power, the ground, and a reset signal which are defined by the CF card standards and are present on the host side for common use to CF cards.

Figure 10:
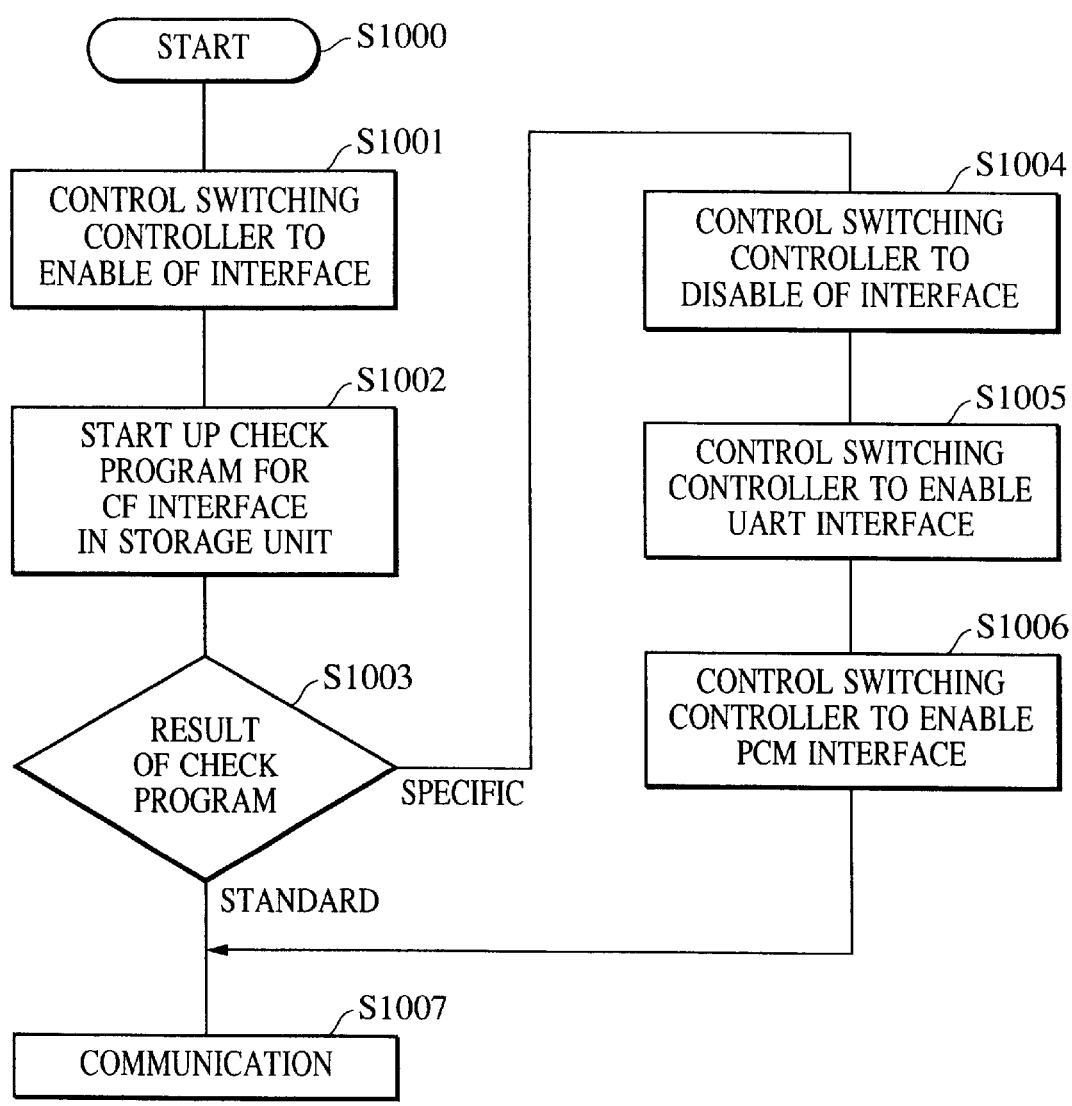
FIG. 10 is a flowchart showing an operation of the CF card according to the fourth embodiment of the present invention.
Figure 11:
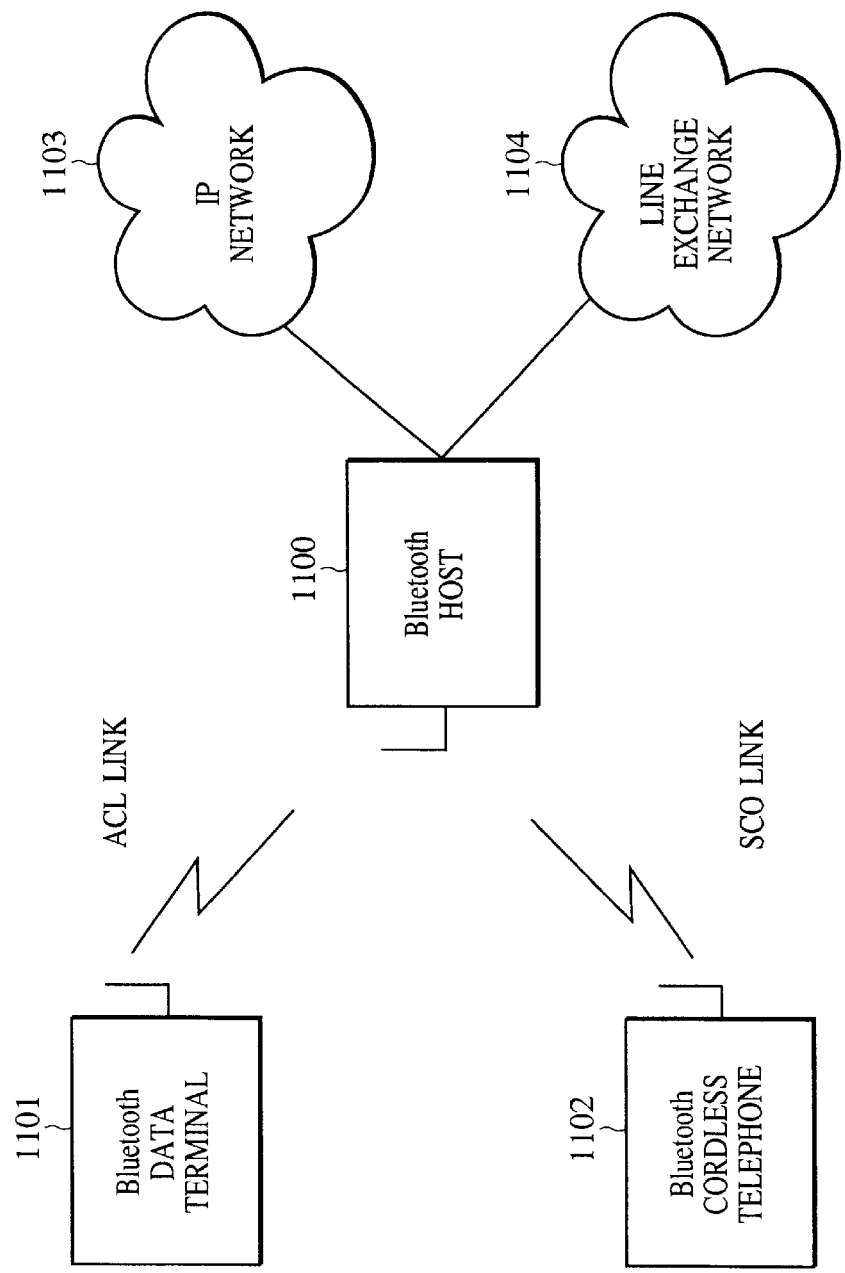
FIG. 11 is a block diagram showing a schematic configuration of a conventional host.
Figure 12:
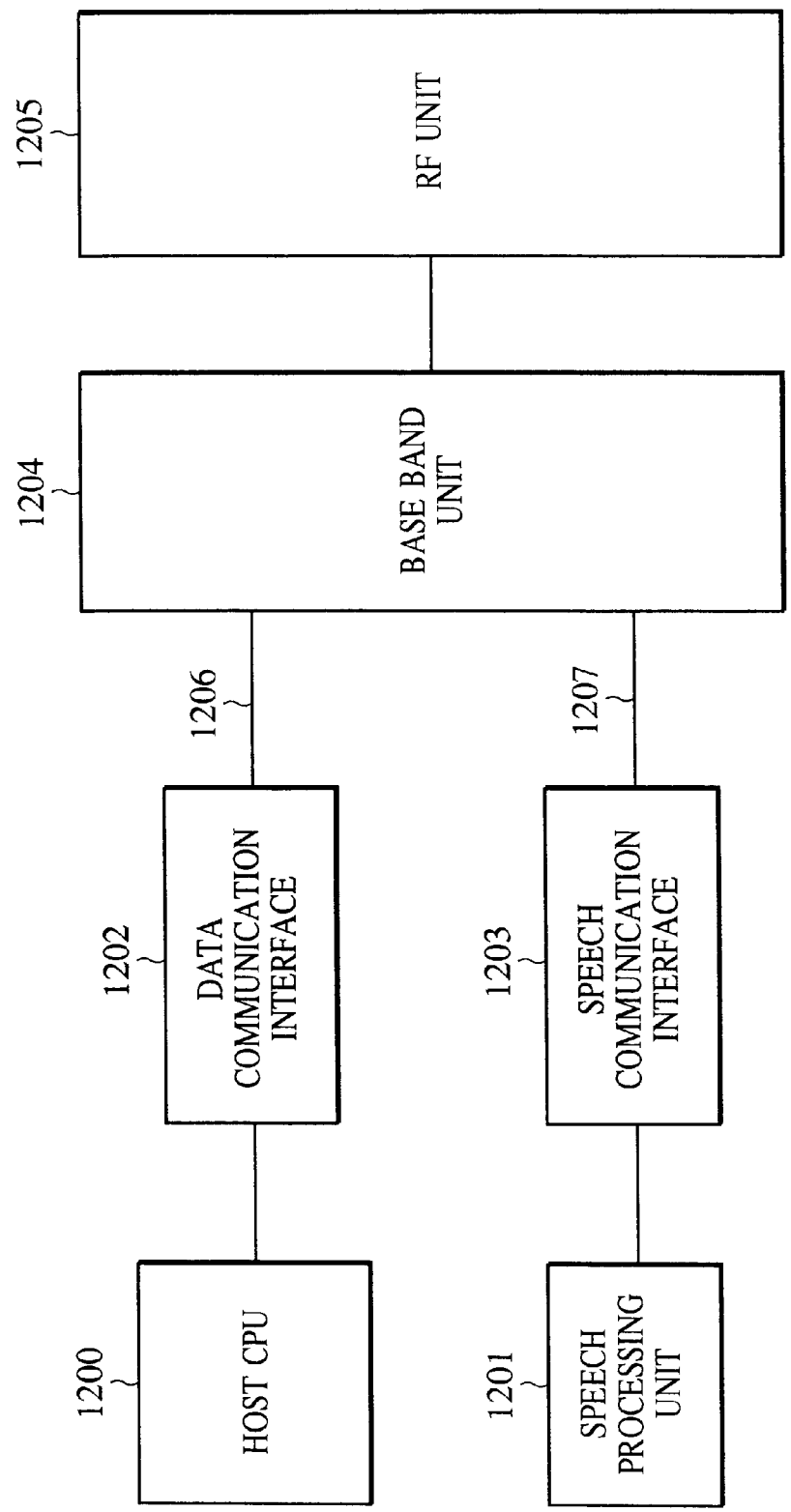
FIG. 12 is a block diagram showing a configuration of a general Bluetooth system.
Figure 13:
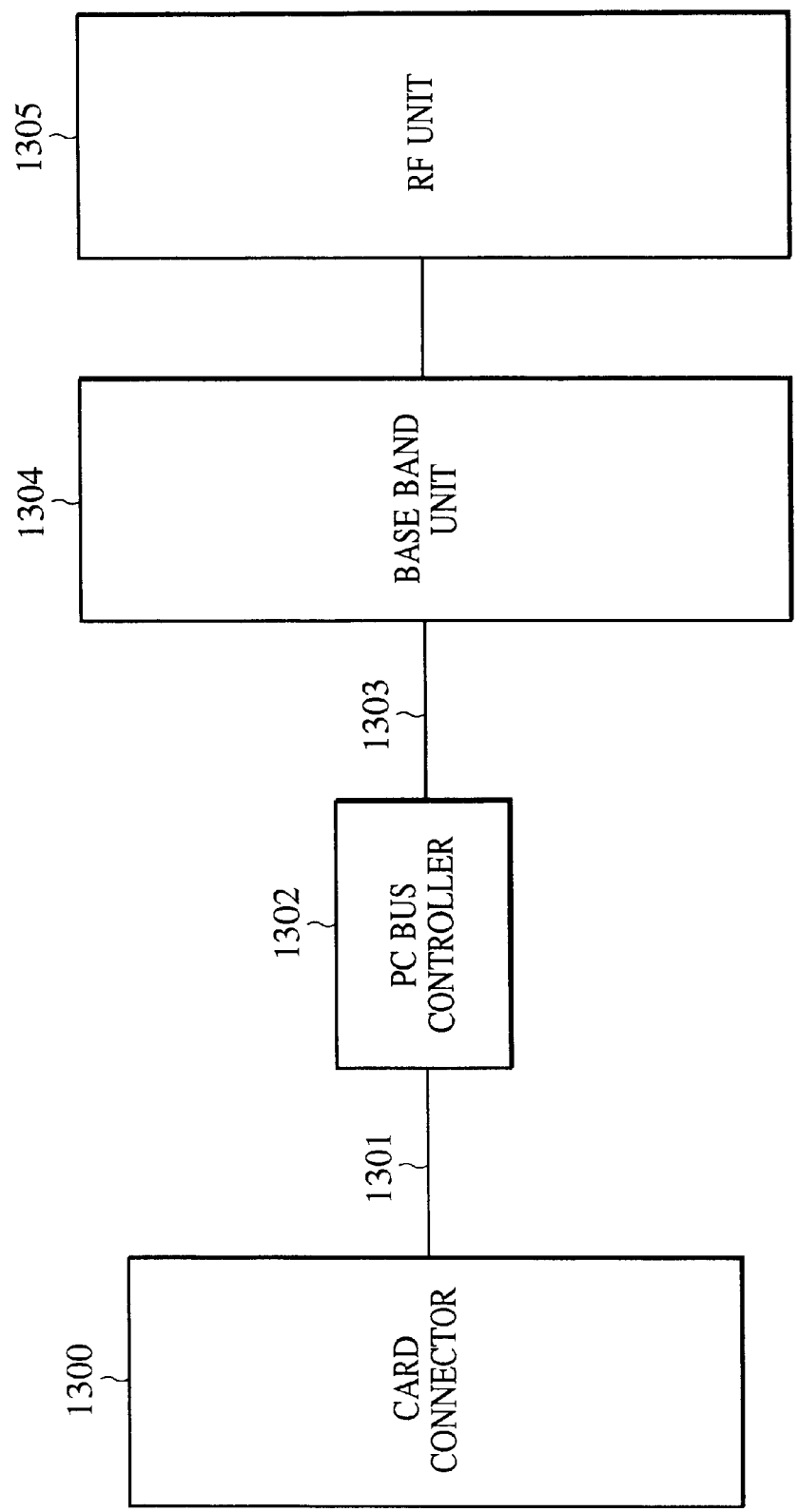
FIG. 13 is a block diagram showing a schematic configuration of a conventional CF card.
Figure 14:
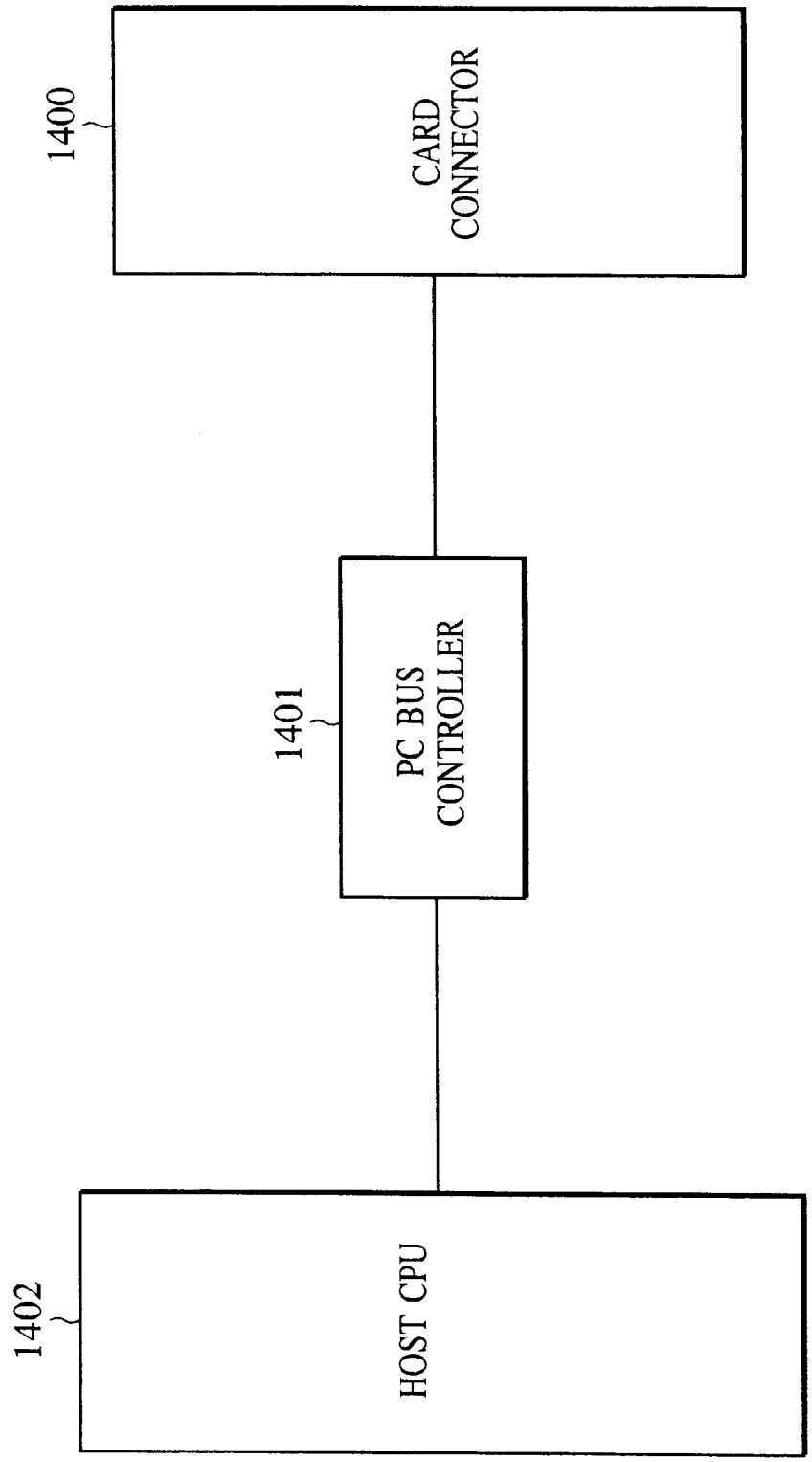
FIG. 14 is a block diagram showing a schematic configuration of a conventional host having a card slot.

FIG. 10 is a flowchart of the control executed in the control unit 800 in the CF card and the host CPU 919 in this embodiment. The switching operation in this embodiment will be described below with reference to FIGS. 8, 9 and 10.

After power-on of the host, the CF card connector 900 of the host holds a state in which it is connected to the CF interface 914. In other words, the signal lines 903 and 902 are connected to each other in the switching block 901, the signal lines 905 and 906 are connected to each other in the switching block 904, and the signal lines 909 and 910 are connected to each other in the switching block 908. When the CF card connector 100 is coupled to a CF card slot of the host and the source power is supplied, the switching controller 121 of the CF card is controlled in step S1001 to establish connections to the CF interface 114. Then, in step S1002, the host and the CF card operate such that the host reads a negotiation program from the storage unit 922 and the CF card reads a negotiation program from the storage unit 801 through the standard interface, thereby deciding the interface for the CF card. In step S1003, a negotiation result obtained from the negotiation programs is detected. If the result shows that the standard interface is decided, the process flow is allowed to proceed to communication in step S1007. On the other hand, if the specific interface is decided to be adapted for both the SCO and ACL links, the switching controllers 921 and 121 are controlled so as to cut off the connection between both the CF interfaces 914 and 114 in step S1004, establish connection between both the UART interfaces 916 and 116 in step S1005, and establish connection between both the PCM interfaces 917 and 117 in step S1006.

Thus, by providing the standard interface and the specific interface in each of the host and the CF card, the system is flexibly adaptable for use in environments and applications. Also, by providing switching means in the host, the host is adaptable for a CF card adapted for SCO, a CF card adapted for the standard interface, and a CF card adapted for both the standard and specific interfaces.

(Fifth Embodiment)

While the first to fourth embodiments have been described on a CF card in conformity with the CFA standards, the present invention can be applied to a PC card in conformity with the PCMCIA unified standards and all other standardized card interfaces. Also, while the above embodiments have been described in connection with a Bluetooth communication function, the present invention is also of course applicable to other communication functions and any functions other than communication. The specific interface can be applied to any type of functions.

According to the present invention, as described above, a card having a communication function is made flexibly adaptable for various situations and use in environments. Also, since a card having a communication function is provided which can selectively set an interface and deal with a plurality of signal forms by a single card, it is possible to realize not only data communication, but also good speech communication, maintaining real-time correspondence. Further, since one joint portion is shared by interfaces adapted for a plurality of signal forms, a card having a communication function can be provided which is economical and convenient to use.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A card having a communication function, comprising:
   first interface means for performing communication in a first card bus signal format between a host and a base band unit which provide communication links for data and speech with wireless communication;
   second interface means for communicating data and speech at the same time in a second signal format between said host and said base band unit;
   coupling/separating means for coupling and separating said host and a wireless communication module through the insertion/withdrawal of a card, wherein said coupling/separating means is shared, in which said first interface means is connected to said host and said second interface means is connected to said host; and
   switching means for selectively switching over between a mode for executing communication with said host using said first interface means and a mode for executing communication with said host using said second interface means, in which said card is connected to said host through said coupling/separating means.

2. A card having a communication function according to claim 1, wherein said second interface means has a Pulse Code Modulation interface as a speech interface.

3. A card having a communication function according to claim 1, wherein said second interface means has an analog interface as a speech interface.

4. A card having a communication function according to claim 1, wherein said second interface means has a Universal Asynchronous Receiver Transmitter interface as a data interface.

5. A card having a communication function according to claim 1, wherein said second interface means has a Universal Serial Bus interface as a data interface.

6. A card having a communication function according to claim 1, wherein the selective switching by said switching means is performed responsive to manual operation of a mechanical switch.

7. A card having a communication function according to claim 1, wherein the selective switching by said switching means is performed responsive to a signal from said host.

8. A card having a communication function according to claim 1, wherein the selective switching by said switching means is performed responsive to negotiation between said card and said host.

9. A card having a communication function according to claim 1, wherein said wireless communication module is a module for performing wireless communication in accordance with Bluetooth standards.

10. A card having a communication function according to claim 1, wherein said coupling/separating means couples said host and said wireless communication module using a plurality of pins, and pins which are brought into non-use states with the selective switching by said switching means are held in high-impedance states.

11. An adapter having a communication function, comprising:

first interface means for performing communication in a first signal format between a communicating unit and another unit which provide communication links for data and speech;

second interface means for performing communication in a second signal format between said communicating unit and said another unit;

coupling/separating means for coupling and separating said another unit and said communicating unit, wherein said coupling/separating means is shared, in which said first interface means is connected to said another unit and said second interface means is connected to said another unit; and switching means for selectively switching over between a mode for executing communication with said another unit using said first interface means and a mode for executing communication with said another unit using said second interface means, in which said adapter is connected to said another unit through said coupling/separating means.

* * * * *